United States Patent [19]

Kaufmann, III et al.

[11] Patent Number: 4,493,650

[45] Date of Patent: Jan. 15, 1985

[54] FOLD-OUT GARMENT BOOK

[75] Inventors: F. William Kaufmann, III; Alan Zwiebel, both of New York, N.Y.

[73] Assignee: Random House, Inc., New York, N.Y. ; a part interest

[21] Appl. No.: 581,399

[22] Filed: Feb. 17, 1984

[51] Int. Cl.³ .................. G09B 17/00; B42D 1/00
[52] U.S. Cl. .................................. 434/178; 2/1; 2/49 R; 281/15 R; 283/63 R
[58] Field of Search ............... 434/178, 433; 2/1, 49, 2/69; 281/15 R; 283/63 R

[56] References Cited

U.S. PATENT DOCUMENTS

| 1,432,249 | 10/1922 | Hoyme . | |
|---|---|---|---|
| 2,461,430 | 2/1949 | Mack | 2/49 R |
| 2,555,962 | 6/1951 | Einstein . | |
| 2,830,297 | 4/1958 | Sabee | 2/49 R |
| 2,853,710 | 9/1958 | Swann . | |
| 2,881,447 | 4/1959 | Shackelford | 2/49 R |
| 3,013,274 | 12/1961 | Dike . | |
| 3,047,875 | 8/1962 | Patterson, Jr. | 2/1 |
| 3,724,101 | 4/1973 | Slezak . | |

Primary Examiner—William H. Grieb
Attorney, Agent, or Firm—Blum, Kaplan, Friedman, Silberman & Beran

[57] ABSTRACT

A fold-out garment book in which a book unfolds to a costume. The book includes a sheet folded to define a plurality of panels which form pages of the book. The pages include printing thereon in a predetermined sequence to present a story. The sheet is unfolded as the pages are viewed in sequence with the unfolded sheet including an opening therein to permit wearing of the sheet as a costume. The panels presented when the sheet is worn in unfolded condition include printing thereon to define the costume.

12 Claims, 8 Drawing Figures

FOLD-OUT GARMENT BOOK

BACKGROUND OF THE INVENTION

The present invention is directed to a fold-out garment book and, in particular, to a children's book which is unfolded by the child as the story is read to present a costume which the child can wear.

The learning of proper and effective reading skills has always been an important part of the educational process for children. Any materials which assist a child in learning to read are extremely important and desirable. Where a children's book also includes play value, children will be more apt to play with and read the book alone, with parents and teachers, and with their peers.

Accordingly, it would be desirable to provide a book which has an inherent play value for increasing a child's interest therein. The fold-out garment book of the present invention meets all of the above requirements.

SUMMARY OF THE INVENTION

Generally speaking, in accordance with the present invention, a fold-out garment book is provided. The book includes a sheet folded to define a plurality of panels which form pages of a book. The pages include printing thereon in a predetermined sequence to present a story. The sheet is unfolded as the pages are viewed in sequence. The unfolded sheet includes an opening therein to permit wearing of the sheet as a costume. The panels presented when the sheet is worn in unfolded condition includes printing thereon to define the costume.

In a preferred embodiment, the sheet is made from a flame-retardant material since it is intended to be worn as a costume. The panels forming the pages in the book include arrows to aid the child in following the story in sequence while permitting proper unfolding of the sheet. The costume presented may be related to the story told by the panels forming the book pages to enhance the play value thereof. The printing on the panels may include both textural material and pictures.

Accordingly, it is an object of the present invention to provide a fold-out garment book.

Another object of the present invention is to provide a book which unfolds to present a costume for wearing by a child.

A further object of the present invention is to provide a fold-out garment book which increases a child's interest in reading the book by providing a play value thereto.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
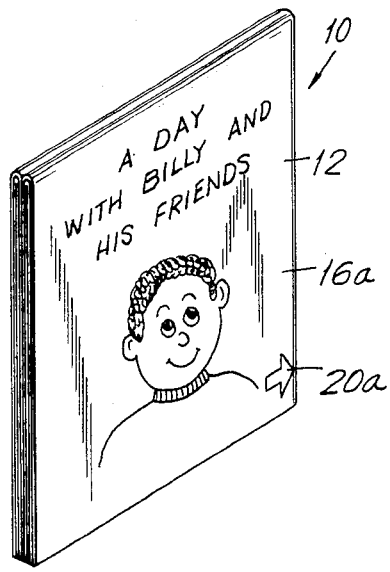
FIG. 1 is a perspective view of a fold-out garment book constructed in accordance with a preferred embodiment of the present invention.
Figure 2:
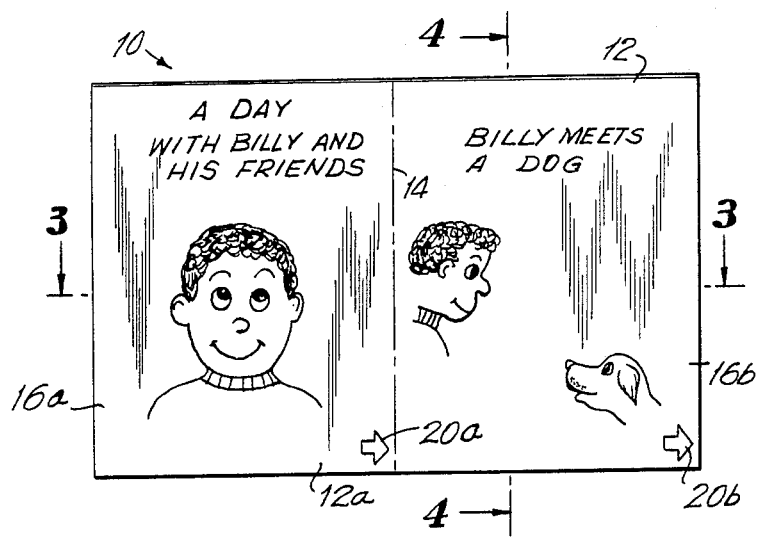
FIG. 2 is a front elevational view of the fold-out garment book depicted in FIG. 1 in a partial unfolded condition.
Figure 3:
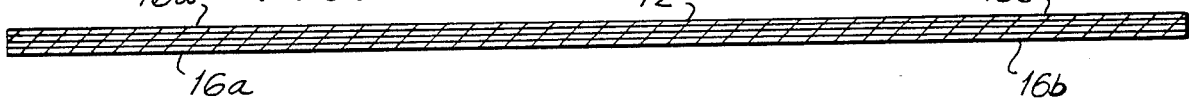
FIG. 3 is an enlarged sectional view taken along line 3—3 of FIG. 2.
Figure 4:
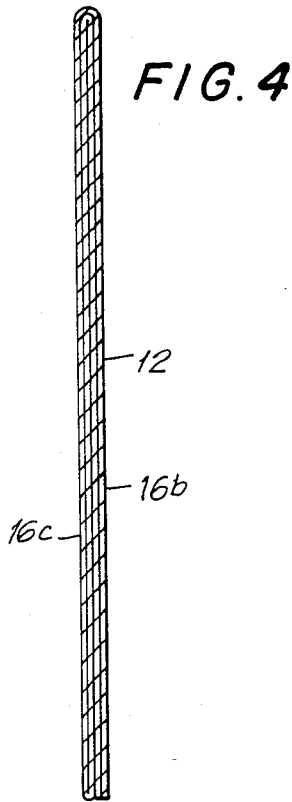
FIG. 4 is an enlarged sectional view taken along line 4—4 of FIG. 2.
Figure 5:
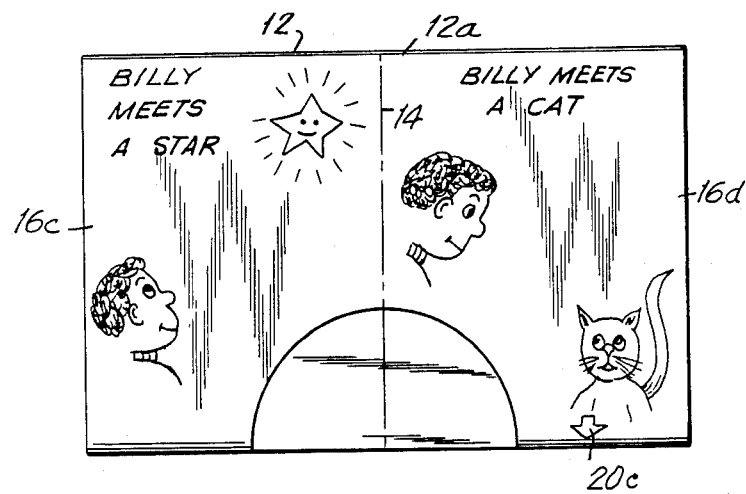
FIG. 5 is a rear elevational view of the fold-out garment book as partially unfolded as depicted in FIG. 2.
Figure 6:
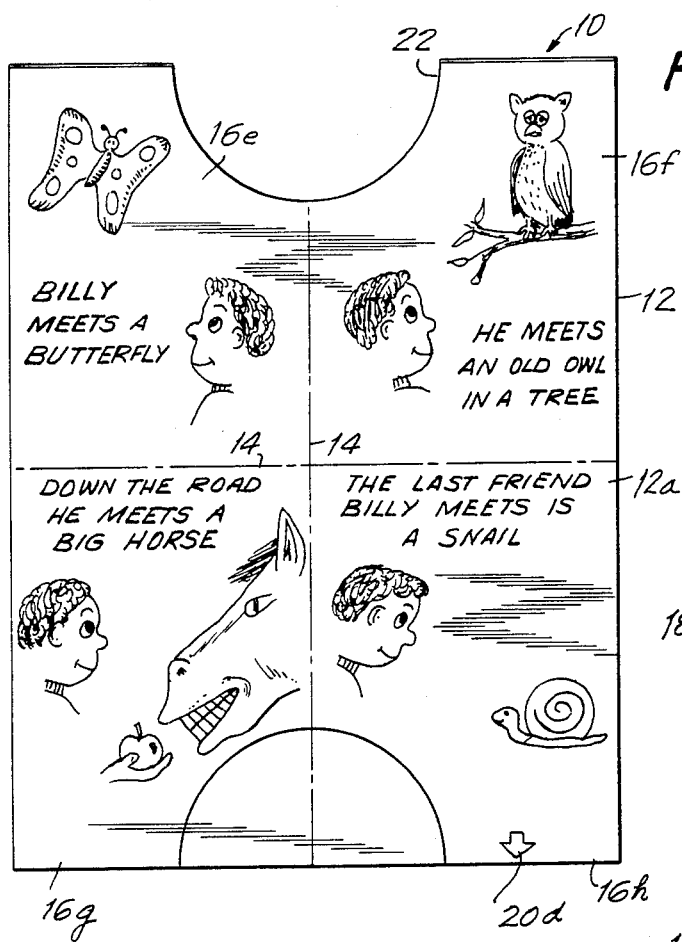
FIG. 6 is an elevational view of the fold-out garment book in further unfolded condition.
Figure 7:
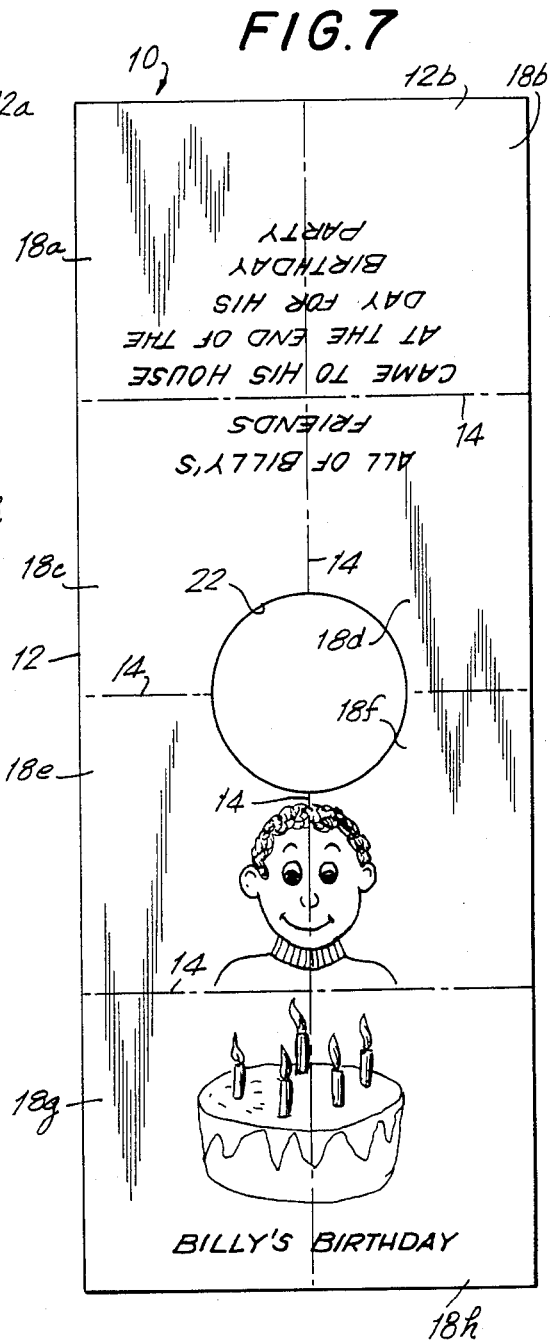
FIG. 7 is an elevational view of the fold-out garment book in its completely unfolded condition.

Reference is made FIGS. 1 through 7 which depict a fold-out garment book, generally indicated at 10, constructed in accordance with a preferred embodiment of the present invention. Book 10 includes a sheet of material 12 which is folded along lines 14 to define a plurality of panels 16a through 16h on a first side 12a of sheet 12 and a plurality of panels 18a through 18h on a second side 12b of sheet 12.

Panels 16a through 16h have printing thereon including text and pictures which together tell a story in sequence. Sheet 12 is folded as depicted so that panels 16a through 16h can be viewed in sequence as sheet 12 is unfolded so that the story told by panels 16a through 16h follows in sequence. Accordingly, panels 16a through 16h define the pages in a book.

Indicators such as arrows 20a through 20d are provided respectively on panels 16a, 16b, 16d, and 16h to aid a child or other person reading book 10 to properly follow the panels in sequence while properly unfolding sheet 12.

Figure 8:
FIG. 8 is a perspective view of a child wearing the fold-out garment book of the present invention.

Panels 18a through 18h on second side 12b of sheet 12 include printing thereon which overlaps the panels so that sheet 12 can be worn as a costume. In this regard, an opening 22 is provided in sheet 12 so that sheet 12 can be worn over the head of a child with the child's head extending through opening 22, as best depicted in FIG. 8. After being worn as a costume, sheet 12 can be refolded to form book 10.

Since sheet 12 will be worn as a costume or garment by children, it is preferred that sheet 12 be manufactured from a material having flame-retardant properties such as a flame-retardant fabric or other such materials. In order to enhance the play value of book 10, it is preferred that the story presented by panels 16a through 16h relate in some fashion to the costume presented by panels 18a through 18h. For example, as depicted, the story relates to Billy's experience on his birthday and the costume is Billy's birthday suit including a picture of a birthday cake. It is noted that many other themes and costume styles can be utilized.

The present invention provides a fold-out garment book with enhanced play value whereby children will be stimulated to read the story told by the book and wear the costume presented thereby. In addition, the child can utilize his imagination to coordinate the costume with the story.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A fold-out garment book comprising a sheet folded to define a plurality of panels which form pages of a book, said pages including printing thereon in a predetermined sequence, said sheet being unfolded as said pages are viewed in sequence, said unfolded sheet including an opening therein to permit wearing of said sheet as a costume, said panels presented when said sheet is worn in unfolded condition including printing thereon to define said costume, whereby a book which unfolds to a costume is provided.

2. The fold-out garment book as claimed in claim 1, wherein said predetermined sequence of said pages tell a story.

3. The fold-out garment book as claimed in claim 2, wherein the printing on said costume is related to the story presented by said pages.

4. The fold-out garment book as claimed in claim 3, wherein said pages defined by said panels include indication means for indicating the direction of sequence of said pages to permit sequential unfolding of said sheet.

5. The fold-out garment book as claimed in claim 4, wherein said indication means include arrows printed on said pages pointing in the direction of the next page to be viewed while unfolding said sheet.

6. The fold-out garment book as claimed in claim 5, wherein said sheet includes first and second sides, the panels on said first side being the pages forming said book, the panels on said second side forming said costume.

7. The fold-out garment book as claimed in claim 6, wherein said sheet is made of a flame-retardant material.

8. The fold-out garment book as claimed in claim 5, wherein said printing on said panels includes text and pictures.

9. The fold-out garment book as claimed in claim 1, wherein said pages defined by said panels include indication means for indicating the direction of sequence of said pages to permit sequential unfolding of said sheet.

10. The fold-out garment book as claimed in claim 9, wherein said indication means include arrows printed on said pages pointing in the direction of the next page to be viewed while unfolding said sheet.

11. The fold-out garment book as claimed in claim 1, wherein said sheet includes first and second sides, the panels on said first side being the pages forming said book, the panels on said second side forming said costume.

12. The fold-out garment book as claimed in claim 1, wherein said sheet is treated with a flame-retardant material.

* * * * *